(12) United States Patent
Joynson et al.

(10) Patent No.: US 7,053,815 B1
(45) Date of Patent: May 30, 2006

(54) RADAR TRACKING SYSTEM

(75) Inventors: David William Joynson, Middlesex (GB); Nigel Stansfield, Hertfordshire (GB); Peter James MacBean, London (GB)

(73) Assignee: Alenia Marconi Systems Limited, Stanmore (GB)

( * ) Notice: Subject to any disclaimer, the term of this patent is extended or adjusted under 35 U.S.C. 154(b) by 1826 days.

(21) Appl. No.: 06/457,406

(22) Filed: Nov. 30, 1982

(30) Foreign Application Priority Data

Nov. 30, 1981 (GB) ............................................. 8136055

(51) Int. Cl.
*G01S 13/66* (2006.01)

(52) U.S. Cl. .............................. 342/62; 342/80; 342/97; 342/99; 342/101; 342/115; 342/116; 342/149; 342/192; 342/196

(58) Field of Classification Search ................. 343/7 A, 343/16 M, 55 A, 5 FT; 342/62, 63, 80, 90, 342/94–101, 115, 116, 149, 150, 152, 192, 342/195, 196
See application file for complete search history.

(56) References Cited

U.S. PATENT DOCUMENTS

| | | | | |
|---|---|---|---|---|
| 3,728,723 A | * | 4/1973 | Gellekink | 343/16 M X |
| 3,952,304 A | * | 4/1976 | Broniwitz et al. | 343/16 M |
| 4,156,875 A | * | 5/1979 | Keane et al. | 343/5 FT X |
| 4,179,696 A | * | 12/1979 | Quesinberry et al. | 343/16 M X |
| 4,271,412 A | * | 6/1981 | Glass et al. | 343/5 FT |
| 4,442,431 A | * | 4/1984 | Bleakney | 343/16 M X |
| 5,047,781 A | * | 9/1991 | Bleakney | 342/149 |
| 5,233,351 A | * | 8/1993 | Gregory et al. | 342/100 |
| 6,771,205 B1 | * | 8/2004 | Barton et al. | 342/13 |

* cited by examiner

*Primary Examiner*—John B. Sotomayor
(74) *Attorney, Agent, or Firm*—Kirschstein, et al.

(57) ABSTRACT

A radar tracking system for an anti-aircraft, missile, including angle tracking, doppler tracking and range tracking feedback loops operating on sum and difference channels. Fast fourier transform digital filters are used to provide a frequency spectrum of the sum and difference I.F. channels and detection and confirmation algorithms are employed for selecting the F.F.T. target 'bin'. Adjacent F.F.T. bins are used to simulate a bin centered on the target frequency, shifts of the latter with target/missile acceleration causing frequency errors which are detected by a discriminator and used to control the target I.F. Confirmation of target acquisition is achieved by successive summations of the target bin power the totals being accumulated and compared with upper and lower thresholds. Confirmation and rejection results from total levels outside the thresholds while further accumulation and comparison follow the intermediate condition. Multiple target discrimination is provided by comparison of two S/N ratios, one obtained from target bin power and average power, and the other obtained from coherent power in the target bin and overall power in the target bin.

14 Claims, 5 Drawing Sheets

Figure 1:
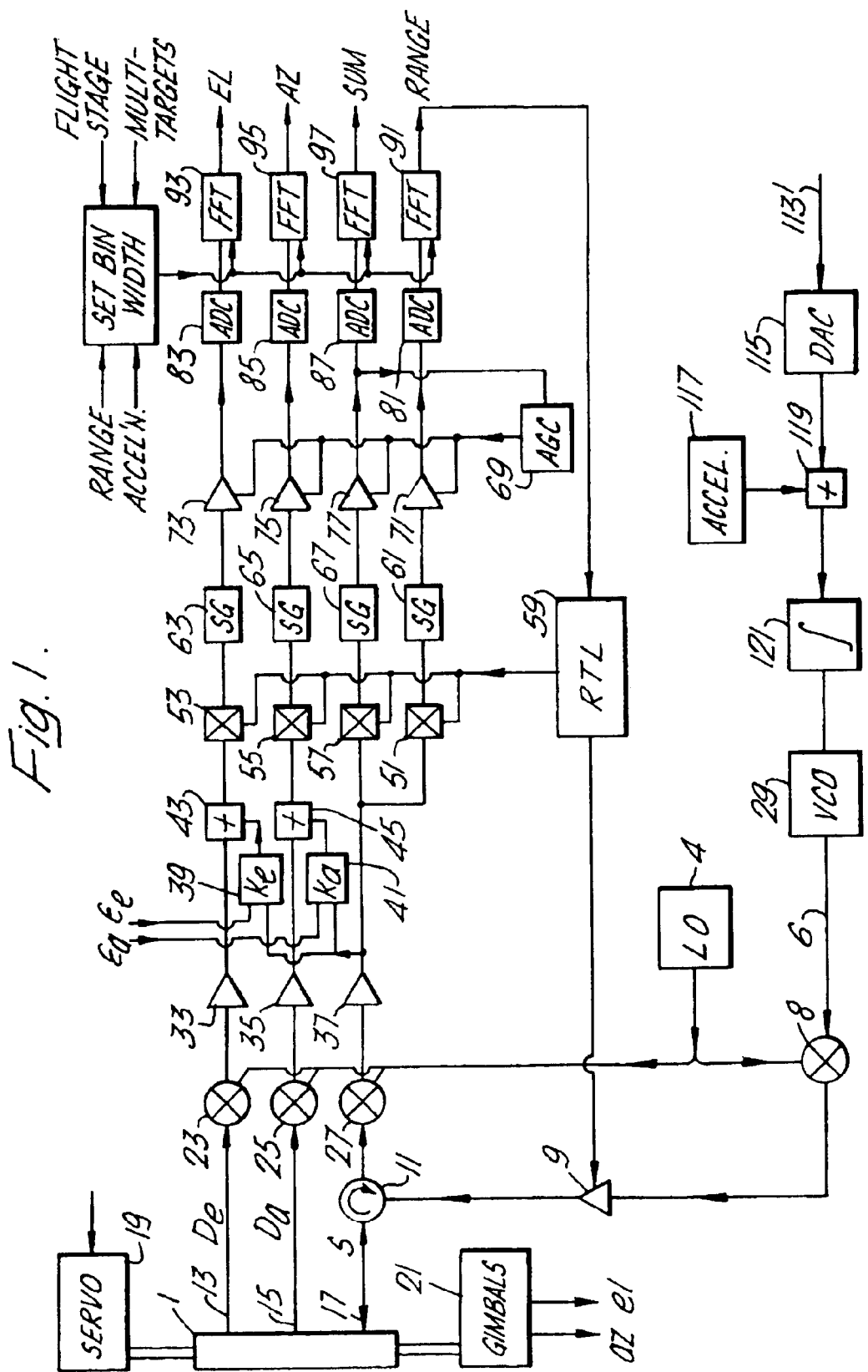

Fig. 4.

| MOVING AVERAGE \ INCREASING SUM TEST | REJECT | DON'T KNOW | CONFIRM |
|---|---|---|---|
| | CONFIRM | DON'T KNOW | CONFIRM | CONFIRM |
| | REJECT | REJECT | DON'T KNOW | CONFIRM |

RADAR TRACKING SYSTEM

This invention relates to radar tracking systems for missiles directed against airborne targets.

The radar system may operate in an active mode in which the target is illuminated by radiation from the missile and in which reflected radiation from the target (termed "skin echo") is received by the missile during its flight. The reflected radiation is processed to obtain the bearings, azimuth and elevation, and the speed or range of the target so that the missile can follow the changes of direction and speed of the target.

An object of the present invention is the improvement of terminal accuracy in a pulse doppler radar seeker.

According to one aspect of the present invention, in a monopulse radar tracking system including either or both of a doppler tracking loop and an angle tracking loop, there are provided means for deriving from a target echo an intermediate frequency (I.F.) signal, means for estimating an I.F. target signal frequency periodically, digital filter means providing a frequency analysis of signals in the I.F. band, the characteristic of the filter means comprising a plurality of similar, sequential, overlapping peaking characteristics, defining respective adjoining frequency bins, means for producing from target signals output in adjacent frequency bins in the vicinity of the estimated target signal frequency a derived signal characteristic having a peak at a predetermined position in relation to the estimated target signal frequency, and means for correcting the estimate of target signal frequency and shifting the derived signal characteristic accordingly, the target signal resulting from said derived signal characteristic being employed in a said tracking loop.

Where there is included a doppler tracking loop having a speedgate filter in the I.F. signal path, the derived signal characteristic may have sections centred symmetrically above and below the estimated target signal frequency, means then being provided for comparing target signal constitutents of the respective sections and thereby determining the frequency error between the actual and estimated target signal frequency, the frequency error being employed to control the I.F. target frequency to tend to maintain it at a predetermined frequency within the pass band of the speedgate. filter and to tend to bring the derived characteristic into alignment with the actual target signal frequency.

In a missile-borne radar tracking system as aforesaid the width of the frequency bins is preferably controllable in dependence upon the estimated value of the difference between the target signal frequency and the predetermined frequency within the speedgate pass band, the bin width being increased in response to a high estimated value to give good tracking ability and decreased in response to a low estimated value to give good velocity discrimination against targets moving at low relative velocities.

In a radar tracking system including an angle tracking loop employing sum and difference channels and and means responsive to a ratio of the sum and difference channels and means responsive to a ratio of the sum and difference signals to provide an indication of angular error between target line of sight and boresight, each of the sum and difference channels preferably employs means for producing a derived signal characteristic, each such derived signal characteristic comprising a peaking characteristic similar to the individual characteristics the digital filter means and centred on the estimated target signal frequency so as to provide a narrow frequency pass band which tracks the estimated target signal frequency.

According to another aspect of the invention, in a monopulse radar tracking system employing sum and difference signals for the determination of target direction, the system comprising a doppler tracking loop maintaining an intermediate frequency target signal within a speedgate filter pass band, and digital filter means in each of the sum and difference channels providing at periodic update intervals, an analysis over a plurality of adjacent frequency bins of target signal components within the said pass band, and in a method of confirming the presence or absence of a target signal within a particular frequency bin, a series of comparison processes are performed, each involving the sum of a predetermined number of successive power output values from the particular frequency bin accumulated with any previous such sums and a comparison of such cumulative sum with upper and lower threshold values which become progressively closer with each comparison process, confirmation of the presence of a target signal in any comparison process being indicated when the upper threshold is exceeded by the cumulative sum, confirmation of the absence of a target signal being indicated when the lower threshold exceeds the cumulative sum, and a further comparison process being initiated when the cumulative sum lies between the upper and lower thresholds.

In such a method, a running average may be established incorporating a fixed number of bin power output values, the earliest incorporated bin power output value being discarded as a current value is incorporated so as to produce a running average bin power, this running average being compared with a predetermined threshold to provide a target-signal-present or absent indication the cumulative sum indication and the running average indication contributing to a net conclusion in which the cumulative sum indication takes precedence if the running average indication points to a target signal absent, and in which the possible results of the cumulative sum indication target signal absent, indeterminate, present, are treated as: indeterminate, present, present, respectively if the running average indication points to a target signal present.

According to a further aspect of the invention, a radar tracking system employing sum and difference signals for the determination of target direction, includes digital filter means in each of the sum and difference channels providing at periodic update intervals an analysis-over a plurality of adjacent frequency bins of potential target signal components, means for identifying a target frequency bin, means for applying sum and difference signals in respect of the identified target frequency-bin as input signals to product means for producing a complex product of one of the input signals and the complex conjugate of the other, a signal-to-noise ratio indication being derived from the imaginary component of the complex product and a power level indication of the sum channel signal within the target frequency bin, the signal-to-noise ratio indication thus having a high value in the presence of incoherent reflections from multiple targets and a low value in the presence of coherent reflections from a single target, the system further including a basic signal-to-noise ratio indication derived from power level within the target frequency bin and average power level over the plurality of frequency bins, this basic indication thus having a high value in the presence of single or multiple targets within the target frequency bin and a low value in the presence of wideband noise, and means responsive to both of the signal-to-noise ratio indications to provide an indication of single or multiple targets.

The relevant features of one embodiment of a pulse doppler radar seeker will now be described, by way of example with reference to the accompanying drawings, of which:—

Figure 2:
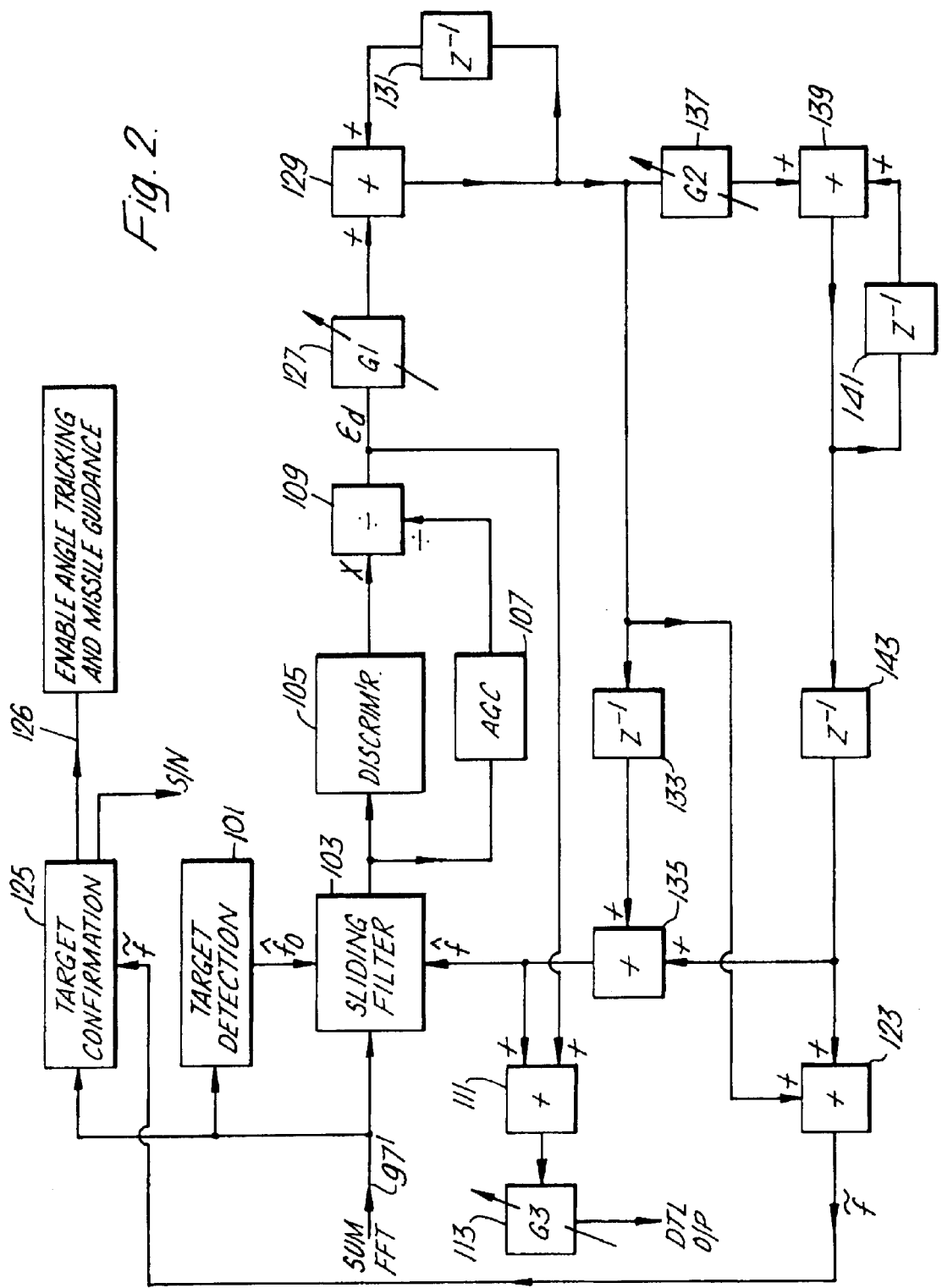
Figure 3:
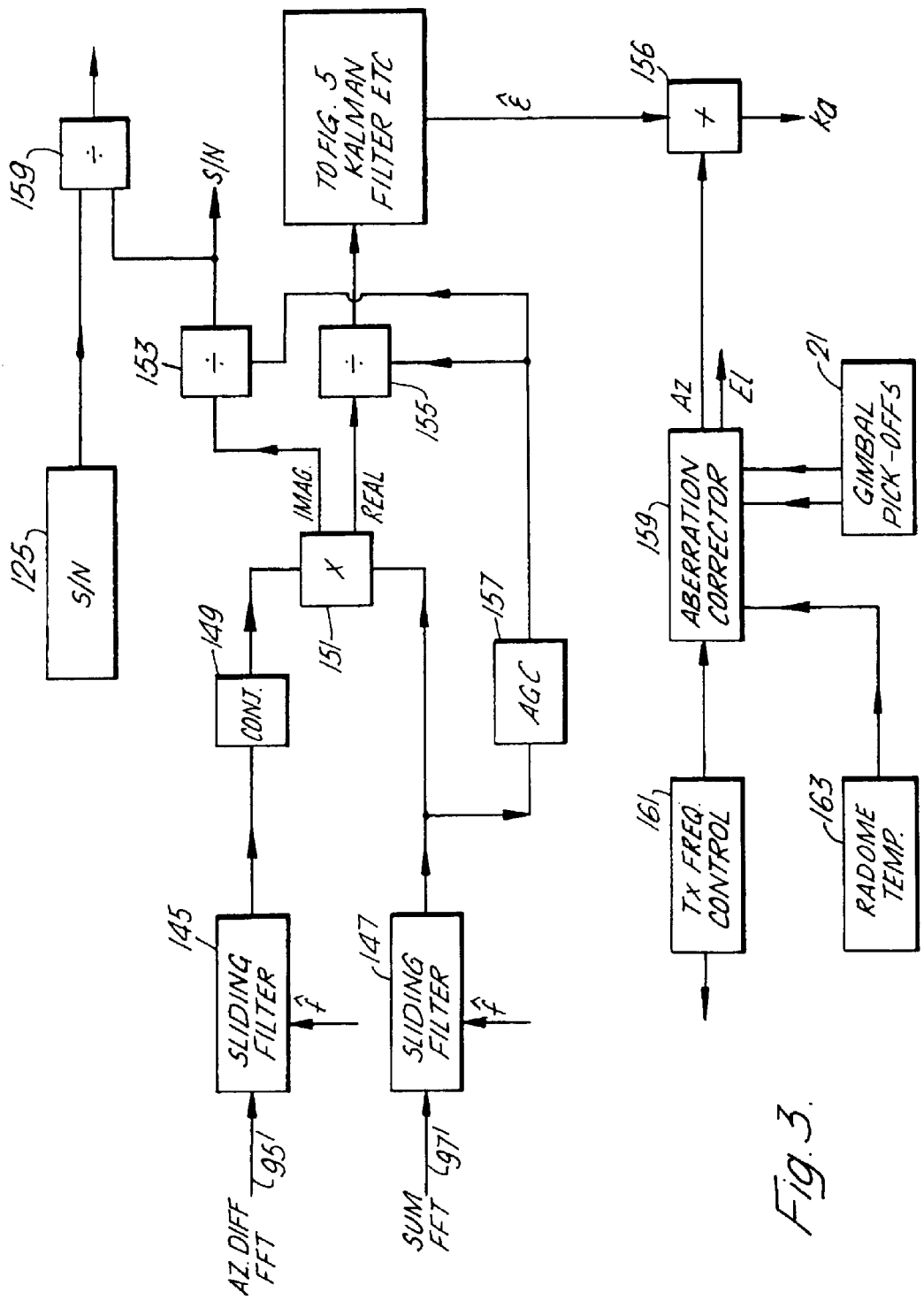
Figure 5:
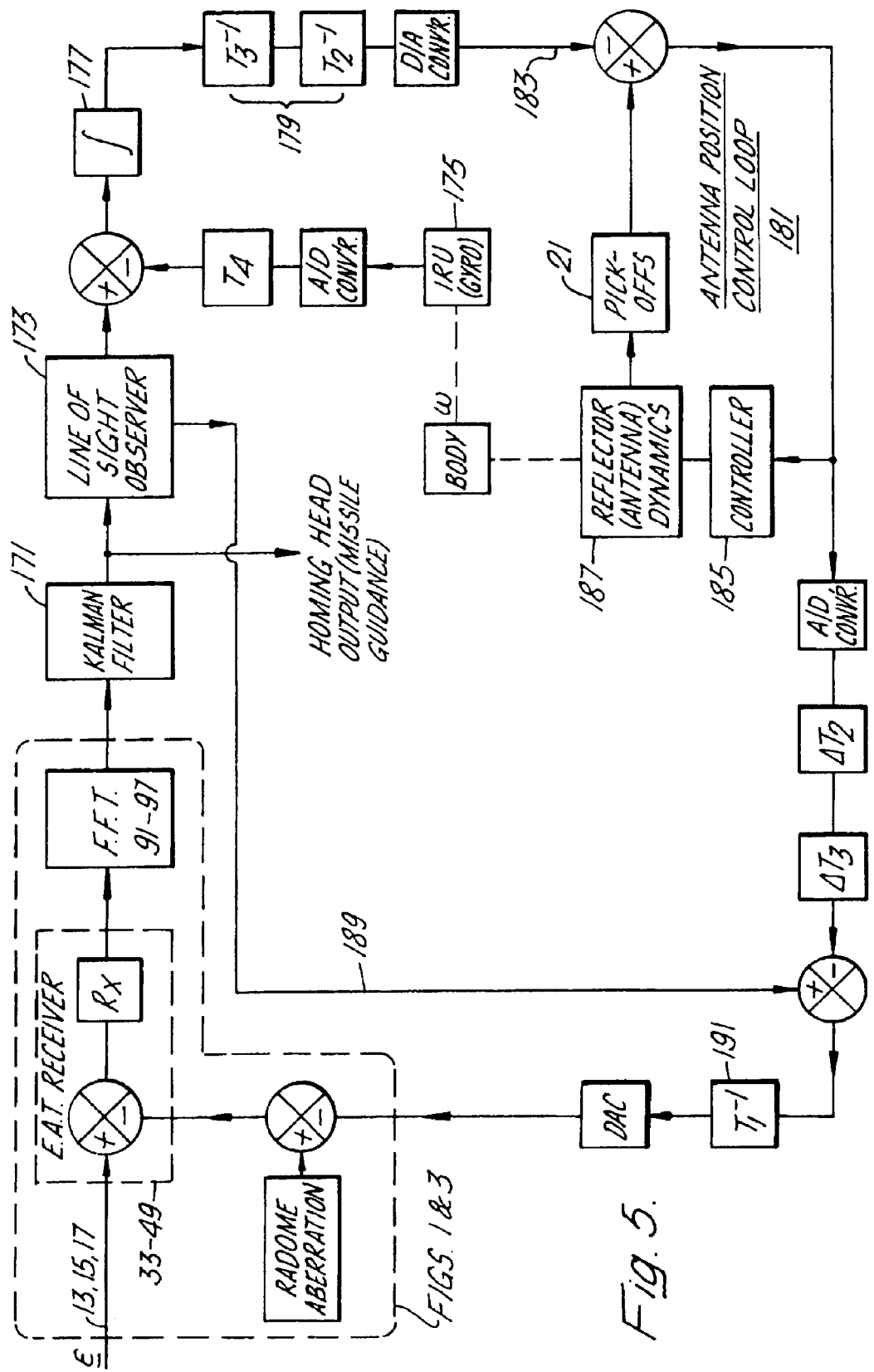

FIGS. 1, 2 and 3 together show, in block diagram form, the basic elements of the system, FIG. 2 showing a doppler tracking loop, and FIG. 3 showing an angle tracking loop together with single/multiple target discrimination circuitry;

FIG. 4 is a table illustrating a combination of target confirmation tests;

and FIG. 5 is a block diagram of an angle tracking and servo-control system.

In that part of the tracking system shown in FIG. 1, an antenna 1 transmits radar pulses of frequency controlled by a local oscillator 4 and doppler tracking control path 6 the local oscillator and control signals being combined by a mixer 8 and applied to the antenna by way of an amplifier 9 and circulator 11, in known manner. The antenna includes a so-called comparator circuit which takes the target echo (and any other received signals) as received by a square array of four elements of the antenna and produces three output channels, the azimuth and elevation difference channels 13 and 15 and the sum channel 17, again in known manner.

The antenna is steerable with respect to the missile by means of servo-controlled motors 19 to attempt to maintain the antenna boresight directed at a target. The actual direction of the boresight relative to the missile is determined by gimbal 'pick-off' transducers 21.

The sum and difference signals are applied to respective mixers 23, 25 and 27 which each have an input from the local oscillator 4, The transmitted frequency is the sum of the local oscillator frequency, a basic intermediate (I.F.) frequency derived from a voltage controlled oscillator (VCO) 29, and the estimated doppler frequency $\hat{f}_d$ corresponding to the voltage applied to the VCO 29., and being the output of the doppler-tracking loop. The output of the mixers 23, 25 and 27 is therefore the I.F. plus the error in the estimation of the doppler frequency (true doppler frequency=$f_d$).

The mixers 23, 25 and 27 are followed by head amplifiers 33, 35 and 37.

Electronic angle tracking (E.A.T.) circuitry then follows in which a respective proportion of the sum signal is added into each of the difference channels, the proportion being $k_a$ for the azimuth difference and $k_\theta$ for the elevation difference. This proportion is calculated to produce a net zero difference channel signal and thus simulate alignment of the boresight and target, the actual off-boresight angle information (apart from error in the derivation) being contained in the control signals $\hat{\epsilon}_a$ and $\hat{\epsilon}_\theta$ (estimated boresight/target sightline error) applied to the E.A.T. elements 39 and 41 on lines 47 and 49.

The resulting sum and difference signals are applied to range gates 53, 55 and 57 which are open for a predetermined short time at a controlled delay period after each radar pulse transmission. The timing of this delay period is controlled by a range tracking loop circuit 59. The sum channel is branched to feed an auxiliary range gate 51 which differs from the others in that the gated period is in two halves in one of which the gated signal is inverted. The output of the sum range gate 57 and the part inverted output of the auxiliary range gate 51 are applied to a phase-sensitive-detector which thus gives zero output if the received signal lies equally in the first and second halves of the auxiliary gate. If the signal lies earlier or later, the PSD output will have a net negative or positive value which is used by the RTL circuit 59 to re-centre all of the range gates on the target signal. The target is thus effectively range tracked.

The range tracking loop 59 also applies an inhibit signal to the transmitter amplifier 9 while the range gates are open to ensure that no breakthrough of transmitted pulse through the circulator 11 can interfere with target echo signals.

Following the range gates 51, 53, 55 and 57, the sum and difference signals are applied to speedgates 61, 63, 65 and 67 respectively. These are in fact band pass filters covering the possible range of doppler frequencies of interest and centred on the above mentioned intermediate frequency. The doppler tracking loop attempts to maintain the various sum and difference target frequencies in the centre of the speedgate pass bands by control of the, VCO 29.

The sum and difference signals are then scaled in accordance with the sum channel signal level by age amplifiers 71, 73, 75 and 77 controlled by an age detector 69.

The signals until this point have all been analogue but are now converted by analogue digital converters 81, 83, 85 and 87 for the purpose of digital frequency analysis. In each of the sum and difference channels is a fast-fourier-transform (FFT) filter (91, 93, 95 and 97). Each such filter comprises an array of perhaps 32, 64, 128, 265, filter elements, typically say, 128, these filter elements respectively covering adjacent narrow frequency bands, and together covering the speedgate passband. The frequency bands of such an FFT filter are known, and will be referred to in this specifications as frequency bins. The characteristic of each bin is of peaked form and overlaps with those of the adjacent bins. The bin outputs arise in digital form, representing the amplitude and phase of the signal component within the particular bin. One set of such output data requires information from 128 analogue samples. The output data rate of the FFT filters, i.e. the 'update rate' is 78 Hertz if the FFT overall bandwidth is 10 kHz and there are 128 bins. Thus the update rate is equal to the individual bin width. The output data rate of the FFT filters, i.e. the 'update rate' may then be about 80 Hertz.

The width of the frequency bins is controllable, as indicated by control circuitry 89, thus covering the I.F. range with few, broad bins, or a greater number of correspondingly narrower bins.

Each of the sum, difference, and range channels is thus analysed into 128 (say) frequency bands within the IF doppler range and a target signal frequency can be identified very narrowly.

Referring now to FIG. 2, this shows the remainder of the doppler tracking loop, which is entirely digital and is constituted by processes performed by a data processor. The input is derived on line 97' from the sum channel FFT filter 97 in FIG. 1, the single input 97' representing all of the 128 sum bin outputs. A target bin detection process 101 makes an initial estimate of the target bin identity, as will be explained, giving an initial target bin frequency $\hat{f}_O$, (as a displacement from the speedgate centre frequency).

A sliding filter process 103 to which the FFT filter-outputs are applied, produces, in response to the initial estimate of target frequency $\hat{f}_O$, a derived characteristic comprising two individual bin characteristics disposed symmetrically above and below $\hat{f}_O$. One of these bins is derived from the left and centre ones of three adjacent bins and the other from the centre and right of the three. Discriminator (105), age (107) and divider (109) processes produce an error signal $\epsilon_d$, being the frequency error between the estimated target frequency ($\hat{f}_O$ in this case) and the actual target frequency.

The error signal $\epsilon_d$ is processed further, as will be explained, but in addition is directly added to the current target frequency estimate $\hat{f}$ (initially $\hat{f}_O$) in a process 111. The result is therefore the current magnitude of the target doppler frequency relative to the speedgate I.F. centre frequency. This digital value is subjected to a gain control process G3 (113) and provided as a digital output of the doppler tracking loop.

Referring again to FIG. 1, the DTL output on line 113' is converted back to analogue form and applied to an integrator 121 which accumulates the doppler frequency error and controls the oscillator VCO (29) accordingly. With a constant frequency error, i.e. constant target acceleration, the loop will lock on to, the target-frequency and cause the VCO frequence to ramp in tracking it. At constant relative target velocity the frequency error will cease, the VCO input will be zero and the VCO output will remain constant at the IF.

An accelerometer 117 detects acceleration of the missile and adds in a corresponding factor to the integrator input by way of adder circuit 119.

Reverting to FIG. 2, the further processing of the discriminator output, referred to above, is also employed to produce from a final addition 123 a signal $\tilde{f}$ which is a further estimate of the target frequency to speed gate centre frequency error. This signal $\tilde{f}$ is employed in a target confirmation process 125 to be explained.

Confirmation of the target bin is employed in several ways: the electronic angle tracking process referred to in FIG. 1 is enabled; the guidance system of the missile is enabled; and incidental to the main arrangement a signal-to-noise indication is obtained for employment in multiple target detection, as will be explained.

Considering FIG. 2 in greater detail now, and in particular the target bin detection process 101, it will be recalled that the FFT circuits in each sum and difference channel provide outputs giving the complex amplitude in each of the FFT filter 'bins' (typically 16, 32, 64, 128 or 256 'bins' according to the bin width control setting 89). The filter bin width is equal to the total FFT bandwidth divided by the number of filter bins and the output data rate is equal approximately to the bin width.

Target detection is carried out on all of the power outputs (i.e. the square of the sum of the real and imaginary components) of the sum channel FFT with the exception of the marginal bins at each end, i.e. the first and last $N_L$ where $N_L$=9, 5, 3, 2, 2 for 256, 128, 64, 32, 16 bin FFTs respectively. The power output of each bin is divided by the average of all the bins excluding the marginal first and last $N_L$, and then this value is compared to a threshold ($T_D$) which is determined so as to allow a certain number of crossings if the input is pure thermal noise (false alarms). The technique is used to compare each bin power, scaled by the average power, as above, with the maximum scaled value of the previous bins and with the threshold $T_D$. The maximum bin at the end of the process which also exceeds $T_D$ is taken as a target alarm for the bin in question. If no bin exceeds the threshold then no alarm is found and the detection process is applied to the next set of FFT data. This detection method can be modified in practice to allow multiple alarms.

If the target alarm is found, its bin number and centre frequency $\hat{f}_O$ is output so that the doppler tracking loop and confirmation processes can act on the correct frequencies. An additional calculation is performed in the detection process. The contents of the alarm bin are reduced by the above threshold value $T_D$. This is done because the probability distribution of the maximum bin which exceeds a given threshold is approximately a constant ($T_D$) plus a Rayleigh distribution (provided $T_D$ is $>\log_e N$). By subtracting the threshold value, the initial alarm can be treated in the same way as subsequent power outputs from the bin and this simplifies the confirmation system.

The calculations performed in the above process for each bin power $p_i$ in order to establish the maximum power bin are:

$$r_i = \frac{p_i}{\sum_{j=N_L+1}^{N-N_L} P_j}$$

where $r_i$ is the scaled power of a bin numbered i; N is the total number of bins; $N_L$ is the number of marginal bins; and j is the number of a bin within those considered for averaging. If $r_i > T_D$ and is also $> r_c^{max}$ then $r_c^{max}$ is set=$r_i$ and i is stored as the alarm bin number. $r_c^{max}$ is the maximum value of $r_i$ 'so far'. The stored value of i which remains when all bins have been considered is then the target alarm bin. This initial setting, or estimate, of the target frequency ($\hat{f}_O$ in FIG. 2) is then employed to close the doppler tracking loop and initiate the target confirmation process. It will be appreciated that the target frequency, while being within the detected bin (i), will not in general be precisely the bin centre frequency $\hat{f}_O$.

In order to get a high probability of target acquisition with a low probability of 'false confirm' it is necessary to sum incoherently over a large number of FFT update periods. To make this possible, target tracking is necessary, since either the target must be kept in a fixed bin or the alarm bin must be known in some other way. For this reason a two stage acquisition process is used. The first stage which has already been described detects the whereabouts of a likely target, the second, confirmation, ensures that this detected signal is indeed a target with a high degree of certainty.

The method of operation of the confirmation process, referenced 125 in FIG. 2, is as follows:—the 'alarm' bin $\tilde{f}$ is designated by the doppler tracking algorithm of FIG. 2, except immediately after the first 'detect' when the detection subroutine provides this information. As in the detection algorithm, thee equivalent of Equation (1) above is used to provide a scaled target/alarm bin output. (If the alarm bin is out of the range $N_L+1$ to $N-N_L$ the scaled bin value is set to zero). Then this scaled 'target bin' value on one FFT data processing is added to the same quantity on the successive update. This summing continues until a predetermined number of FFT power output values from the target bin have been added together. At this point the sum is compared to two thresholds, an upper and lower threshold. If the sum of the bins is greater than the upper threshold then a 'target present' flag is set, if the sum is less than the lower threshold, 'target absent' is confirmed, or in other words the suspected target is rejected. If the sum is in between then the flag remains in a 'don't know' state. In this case a further set of 'target' bin power values from successive FFT updates are added to the first set and the accumulated total compared to two new and closer thresholds, the upper one again denoting 'confirmed presence' and the lower one 'confirmed absence'.

After a predetermined number of such comparison stages (provided as an input to the program) the upper and lower thresholds are made to coincide so that a definite decision is forced although it may not be conclusive, as will be seen.

This successive comparison test is called the 'cumulative sum' indication.

At this point a running average of the last N sets, each of N FFT updates begins. As the current bin power value is incorporated in the running total the earliest value so incorporated is discarded. The criterion for confirmation is that the running average should be above a threshold (normally taken to be the last comparison process converged-threshold) and that in addition the individual comparison processes should not reject. This latter test is put in to ensure reasonably rapid response if the target should suddenly disappear for some reason.

The result is a 'running average' indication.

The 'cumulative sum' indication and the 'running average' indication are combined as illustrated in FIG. 4 to provide a net conclusion. It may be seen that the cumulative sum indication takes precedence if the running average indication is negative, while the cumulative sum indication is, in effect, endorsed by one level of indication certainty if the running average indication is positive.

In addition a certain amount of re-initialisation takes place. If the overall confirmation goes off the 'confirm present' state the running average is stopped. Also if the cumulative sum test rejects or confirms, the accumulation of sub-set sums ceases and each subsequent sub-set is tested separately.

When target confirmation (125) is complete the 'confirm present' output 126 is used to enable the angle tracking loop and the missile guidance loop.

The doppler tracking system employed allows doppler tracking to take place both within the digital processor of FIG. 2 and through the analogue VCO 29 in FIG. 1. The key function that allows tracking to take place within the data processor itself is the sliding filter/discriminator-process, 103, 105, 107, 109.

To form a frequency discriminator the power output of two neighbouring bins can be subtracted. If the target signal sits symmetrically astride the junction of the two bins the power in each will be the same and the difference will be zero. If the target signal is off centre one way or the other the result will be positive or negative accordingly. If two such bins, centred on a specified target frequency estimate, can be simulated, therefore, frequency shift from this central position can be detected and the target signal frequency tracked continuously.

To vary the position of the discriminator continuously in this way a technique of (effectively) sliding the filters of the FFT filter 97 is adopted, which requires the simulation of each of the two simulated bins mentioned above. The following applies to the simulation of each of the two. Given the complex output of two existing adjacent FFT bins it is possible to construct by using these two quantities alone a new FFT bin which will have as its peak any chosen value of frequency between the mid-point of the two original bins. In order to derive a simple algorithm a rectangular window is assumed and phase factors between adjacent bins of $\pi/N$ are ignored. The new FFT bin characteristic can be written approximately as:

$$f(x) = \frac{\alpha \sin\pi x}{x} + \frac{\beta \sin\pi(1-x)}{(1-x)} \quad (2)$$

where x is the fraction of a bin from the centre of the first FFT bin where the response is required, $\alpha$ is the amplitude contribution of the first bin, and $\beta$ is the amplitude contribution of the second bin. It can be shown that if $\alpha$, $\beta$ are related by a parameter $\delta$ as follows:

$$\beta = 1 - \alpha$$

$$\alpha = \frac{-\delta^2[1 + \pi\cot\pi\delta(1-\delta)]}{\pi\cot\pi\delta(\delta(1-\delta)(1-2\delta)) - 1 + 2\delta - 2\delta^2}$$

then the point $f(x=\delta)$ is a maximum of the filter of Equation (2). Hence a sliding filter can be implemented by taking the frequency f, evaluating the bins nearest to this and then calculating the parameters as $\alpha$, $\beta$ needed to give two filter bins each separated by one half a bin separation from the estimated target frequency ($\hat{f}$). The same technique is used on the filters regardless of the type of window that is being used. The equations for the sliding filters thus become:—

$$N_{ta} = \text{Integral part of } ((\hat{f}+0.5B)t_s+1.5)$$

$$x = -0.5 + N_{ta} - N_p - \hat{f}t_s$$

$C_1 = \alpha(x)$ (i.e. the above function $\alpha$ calculated for predetermined set of x values)

$$C_a = C_1 b(N_{ta}-1) - (1-C_1)b(N_{ta})$$

$$C_b = (1-C_1)b(N_{ta}+1) - C_1 b(N_{ta})$$

where $N_{ta}$ is the number of the bin 'intersected' by the required frequency, $\hat{f}$ is the estimated doppler frequency according to the digital tracking loop, B is the overall FFT bandwidth, $t_s$ is the update time (=No. of bins÷B), $N_p$ is half the number of bins in the FFT and b(N); is the the $N^{th}$ FFT bin (complex). Thus $C_a$ and $C_b$ are the sliding filter outputs of simulated adjacent bins centred on the frequency $\hat{f}$, and are again complex.

It is then necessary to construct the discriminator 105 of FIG. 2, and this can be done by taking the frequency error $d = |C_a|^2 - |C_b|^2$. However, the sliding filter technique results in a scaling at the origin of this quantity which depends on filter position and hence a correction for this has to be applied. A quadratic correction term is used of the form $$s_d = a_1 + a_2\bar{x} + a_e\bar{x}^2$$

where $\bar{x} = \min(x, 1-x)$ and $a_1$, $a_2$, $a_3$ take various values for the different window functions being used. This also allows the discriminator to be automatically scaled for the appropriate window function.

The discriminator output 'd' must also be automatically gain controlled and this is accomplished by a simple first order feedback system operating off a square law detector 107. The detector operates off a new bin of the form $$C_{age} = C_a + C_b$$

which gives a filter centred on the target frequency. In conjunction with the discriminator this is believed to give optimum performance. The age is thus $$\text{age}_n = \text{age}_{n-1}k + (1-k)/^C\text{age}/^2 S_c$$

where $S_c$ is another scale correcting factor for the different gains found at different positions of the sliding filter and different windows. This is given by $$S_C = 1 + \bar{x}b_1 + \bar{x}^2 b_2$$

where $b_1$ and $b_2$ are constants depending on the type of window. k equals $\exp(-t_s/t_{age})$ where $t_{age}$ is the age time constant. The resultant discriminator output $\epsilon_d$ (from divider 109) is $$\epsilon_d = dS_c S_d/(\text{Age}_n t)Hz$$

The digital tracking loop is closed entirely within the data processor (see FIG. 2) and provides the estimate of target frequency $\hat{f}$ that is needed for the confirmation process. The particular implementation used is a type two loop. A block diagram of the system is shown in FIG. 2.

It can be seen that there are two outputs of the loop, one for the confirmation process ($\hat{f}$) and one feedback ($\hat{f}$) to the sliding filter/discriminator. The transfer functions of these two are different and are given by $$\frac{\hat{f}}{f} = \frac{zG_1(1+G_2) - G_1}{z^2 + z(G_1(1+G_2) - 2) + (1 - G_1)}$$

$$\frac{\tilde{f}}{f} = \frac{z^2 G_1 + G_1(G_2 - 1)z}{z^2 + z(G_1(1+G_2) - 2) + (1 - G_1)}$$

Where f is the target frequency relative to the centre of the IF sum channel. These transfer functions are implemented by taking the output of the discriminator $\epsilon_d$ and then multiplying by the gain (G1).

The algorithms for the implementation of these two closed loop transfer functions are as follows. If the discriminator output is $\epsilon_d$ then $$f_1(n) = f_1(n-1) + G_1 \epsilon_d$$

$$f_2(n) = f_2(n-1) + G_2 f_1(n)$$

$$\hat{f}(n) = f_1(n) + f_2(n)$$

$$\tilde{f}(n) = f_1(n) + f_2(n-1)$$

These algorithms are illustrated in FIG. 2 as follows. The output $\epsilon_d$ of the discriminator processes 105, 107, 109 is subjected to a gain G1 (127) producing an input $G_1 \epsilon_d$ to a summing process 129 a storage delay device 131 feeds back the output of the summing process 129 to its input at the following update. If $f_1(n)$ is the output of the summing process 129 on the nth update, $f_1(n)$ must therefore be equal to $G_1 \epsilon_d + f_1(n-1)$, the loop therefore constituting a digital integration. The output of the loop, $f_1(n)$ is applied to a further storage delay device 133 whose output $f_1(n-1)$ is applied to a summing process 135. A second input to this summing process is derived from the output $f_1(n)$ of the above loop as subjected to a gain G2 (137) to give $G_2 f_1(n)$ and a further integrating loop 139, 141 to give $f_2(n)$ equal to $f_2(n-1) + G_2 f_1(n)$. A further storage/delay device 143 then gives $f_2(n-1)$ the other input to summing process 135.

The output of summing process 135 is thus $\tilde{f}(n-1) = f_1(n-1) + f_2(n-1)$ i.e. the estimated target frequency based on the preceding update of the FFT data. This output is applied to the sliding filter process 103 for calculation of the next error $\epsilon_d$ and is also applied to summing process 111 together with the current error $\epsilon_d$ as previously described, to provide the doppler tracking loop output.

The signal $f_2(n-1)$ is applied to a further summing process 123 but in this case with the current input to process 135, i.e. $f_1(n)$. The summed output of process 123 is thus $f_1(n) + f_2(n-1)$, denoted $\hat{f}$ and applied as the estimated target frequency to confirmation process 125, as previously described.

Referring now to FIG. 3 the FFT outputs from the azimuth difference filters 95 are input on lines represented by 95' and the sum FFT outputs similarly on lines 97'. These sum and difference outputs, each from, typically 128 bins, are applied to respective sliding filter processes 145 and 147 similar to those described for the doppler loop of FIG. 2. In each case the estimated target frequency f derived from the doppler loop is used to select the bin in which it falls, a new or 'supposed' bin being derived from this bin and an adjacent bin, the simulated bin having its centre or peak frequency aligned with the estimated target frequency. Changes in the target frequency as determined by the doppler tracking loop cause the value of $\hat{f}$ to change, the simulated bin remaining locked to it and thus sliding up and down the I.F. range with the doppler error frequency and providing a high degree of target velocity discrimination.

The sliding filter outputs are in digital form and are therefore applied to the digital equivalent of a phase-sensitive-detector. Thus the difference signal in complex form has its complex conjugate formed by a process 149. The sum and complex conjugate of the difference are then multiplied together by a process 151 which produces real and imaginary outputs. The real part is divided by an age detector (157) output to give the amplitude ratio for each of the two channels i.e.

$$\frac{(D_e - k_e S)S}{S^2} \text{ and } \frac{(D_a - k_a S)S}{S^2}$$

where $S^2$, the mean square of the sum signal, is the output of the age detector 157. Only the azimuth difference channel is shown but the elevation difference channel is treated similarly. This is fed to a Kalman filter in FIG. 5 to give an output $\hat{\epsilon}$. $\hat{\epsilon}$ is added to an aberration correction factor and fed to the EAT gain element to close the loop. The Kalman filter in FIG. 5 produces an estimate $\hat{\epsilon}_a$ of the boresight error, that is the estimated value of the target angle off boresight. This error estimate is combined in a summing process 156 with a boresight direction indication relative to the missile. The latter is provided basically by gimbal pick-off transducers 21 (shown in FIG. 1 also) corrected for radome aberration (150) which itself is dependent upon; boresight direction relative to the radome; radome temperature (163); and transmitted frequency (161). The aberration corrector thus produces azimuth and elevation angles of the effective boresight rather than the physical boresight.

The resulting signal $k_a$ output from summing process 156 is employed in FIG. 1 to control the EAT element 41 and close the EAT loop.

When the EAT loop is in equilibrium the value $\hat{\epsilon}$ gives a true measure of the boresight error.

Considering now the imaginary output of the product 151, this is divided by the age signal in divider 153 to give a form of signal-to-noise indication. This output of the divider 153 gives an indication of the power of the signal components that are either incoherent between the sum and difference channels or in phase quadrature. The 'incoherent' power component is large when thermal noise or jamming in either the sum or the difference channels is large, and tends to zero at high signal to noise ratio. The incoherent power output is also large on extended targets or on targets flying in formation that are unresolved by the seeker.

The signal-to-noise (S/N) signal output from 153 is applied to a dividing process 159 the other input of which is derived from the S/N output of the target confirmation process 125 of FIGS. 2 and 3. The two S/N indications differ in that the basic indication, from the confirmation circuit is derived as a ratio of the power in the target bin to the average power over the FFT band. It does not therefore distinguish between a coherent single target in the target bin and incoherent multiple targets within the target bin. The QPSD S/N indication is derived solely from the target bin and distinguishes only between coherent (single) targets on one hand and multiple targets and noise on the other, giving a low value for the coherent target and a high value for the incoherent targets. If, therefore, the QPSD S/N indication is divided by the basic S/N indication from the confirmation process the result will be a low value for a single coherent target in the target bin and a high value for multiple targets in the target bin. The result of the division process 159 thus gives an indication of single or multiple targets.

The system as described is adaptable for the various missile/target conditions that may arise in an engagement, and in particular in the terminal stages where conditions may change rapidly.

The parameters in the doppler loop are made adaptive to allow for changing target conditions so that optimum performance is maintained at all times. Referring to FIG. 2:

(i) Immediately after target detection, gains G1, G2 and G3 are set to high values so that the loop settles quickly. The gains are then reduced until, after a predetermined length of time, the gains take constant lower values to reduce the noise in the loop. The gains are increased as the missile flight progresses according to the signal strength measured in the age amplifiers (connection from age not shown), or by one or other of the signal to noise assessment indications described above, and according to the FFT bin width selected (see below).

(ii) During the missile boost phase, the doppler tracking loop experiences substantial transients and the FFT bin width is selected to be a large value. Gains G1, G2 and G3 are also set to high values to give a rapid response.

(iii) If a target at long range is to be acquired, the FFT bin width is set to be very narrow, and G1, G2 and G3 are set to low values after loop pull in. This optimises the acquisition threshold.

(iv) If the target is at short range the FFT bin-width is set to be wide and G1, G2 and G3 are set to high values. This optimises acquisition speed and minimises tracking errors. A wide FFT binwidth gives a faster update rate and hence gives the optimum performance very close to impact when rapid response is important. Target range is determined from the range tracking loop (FIG. 1).

(v) Once the loop has pulled in, the signal f is proportional to the target frequency rate, i.e. the target acceleration. If f is large the FFT binwidth is set to a high value to allow a rapid tracking ability. The loss in doppler discrimination against other targets at similar speeds is not important since a manoeuvring target is not able to keep in close proximity to other targets. When $\hat{f}$ is small, a small FFT binwidth is used to give maximum doppler discrimination against targets flying in formation.

(vi) When multiple targets in close proximity are detected (e.g. by the output from divider 159 in FIG. 3) or the target acceleration is small, the FFT binwidth is set to a low value to give maximum doppler discrimination.

The overall angle tracking system can be conveniently divided into three parts. Firstly the EAT receiver, secondly the angle tracking filter and thirdly the servo control and stabilisation system. A block diagram of the complete angle tracking and servo control system is shown in FIG. 5. The angle tracking filter estimate $\hat{\epsilon}$ of boresight error angle in each of the azimuth and elevation channels is used to add a controlled portion of the sum channel which corresponds to these angles according to the stored D/S slope at the origin, into the difference channels, as described above with reference to FIGS. 1 and 3. These difference signals then pass through similar IF chains as for the sum channel, are sampled and analogue-to-digital converted (81–87). They are then fourier transformed (91–97) to give the spectrum of signals on the azimuth and elevation channels. The sum and difference channels are divided by age signals digitally and elevation and azimuth phase-sensitive-detector outputs are formed (155) by taking the real part of D*×S; these outputs are proportional to the angular error between the true target boresight error and the best estimate of the boresight error. These calculations are all performed at the same update rate as the doppler and range tracking loops (i.e. at the update rate of the FFT output).

After the PSD's (151) it is necessary to perform an axis transformation order to transform from receiver axes to line of sight axes. This is implemented digitally. These signals are then passed through an angle tracking (Kalman) filter (171) which produces best estimates of sight line rate using a variable gain algorithm. The sight line rate signals are used in various ways; firstly they provide an output to the autopilot as the guidance command, for a which purpose they are transformed into missile axes; the are also used as the input to the EAT integrator which feeds estimate of angle back to the EAT element and finally it is used as input to the line of sight observer (173) to drive the antenna mechanism. This latter is added to an inertial reference unit (IRU) gyro output (175) in order to provide the total movement of the, target as, measured in line of sight axes.

These angular rates are still calculated at the (low) update rate of the loop. These rates are then integrated using a high update digital integrator 177 and the output is transformed from line of sight, axes into motor shaft angles using digital axes transformations 179. The angle demands are then used to control a position control loop 181 for the antenna. The angle demand 183 is subtracted from the potentiometer pick-offs 21 and the error is fed into a controller 185 which feeds demands to the antenna mechanism, servo and motors 187. The antenna/reflector plate is thus position slaved to the integrated IRU gyro and the target sight line error. A high update rate controller is used The effect of this is to remove body motions on the receiver output. An additional line of sight feed back 189 is used to the EAT element (39, 41). This is added to the other feedback path and ensures that the best estimate of sight line error can be used to subtract from the actual-sight line error for EAT. The combined EAT feedback path has to be angle transformed (191) back into receiver axes and a radome aberration correction (159) is added in, as a function of the gimbal angles, as described in relation to FIG. 3.

The Kalman filter parameters are varied as a function of conditions during missile flight and in general are arranged to give high bandwidth when the estimated time to impact is small. Time to impact is estimated by dividing the missile-target range (from the range tracking loop) by the closing velocity (from the doppler tracking loop). The filter bandwidth is also made a function of signal to noise ratio, the band-width being low when the signal to noise ratio is low.

It may be seen that a versatile tracking system has been-described. The sliding filters permit discrimination between closely spaced targets the doppler resolution being twice as good as with fixed FFT filters.

An improved signal/noise ratio can also be obtained by sliding the simulated bin peak on to the target.

Discrimination of multiple targets, e.g. by tracking one target and monitoring another, can be achieved merely by duplicating the sliding filters.

We claim:

1. A monopulse radar tracking system, including
  (A) at least one of a Doppler tracking loop and an angle tracking loop;
  (B) means for deriving from a target echo an intermediate frequency (I.F.) signal;
  (C) means for estimating an I.F. target signal frequency periodically;
  (D) digital filter means providing a frequency analysis of signals in the I.F. band;
    (i) the characteristic of said filter means comprising a plurality of similar, sequential, overlapping, peaking characteristics, defining respective adjoining frequency bins, (E) means for producing from a first pair of adjoining frequency bins a derived bin characteristic similar to said peaking characteristics, (ii) from a second pair of adjoining frequency bins a further, similar derived bin characteristic, (iii) the two derived bin characteristics lying symmetrically astride the estimated target signal frequency, (F) means for controlling the position of said two derived bin characteristics continuously, and (G) means for determining the frequency error between the target signal frequency and the centers of said two derived bin characteristics and effectively sliding said two derived bin characteristics to re-center them on the newly determined position of the target signal.

2. A radar tracking system according to claim 1, including a Doppler tracking loop having a speedgate filter in the I.F. signal path and comprising means responsive to the power outputs within said two derived bin characteristics and means for obtaining an algebraic difference of the power outputs to indicate the degree and direction of said frequency error, said frequency error being employed to control the I.F. target frequency to tend to maintain it at a predetermined frequency within the passband of said speedgate filter.

3. A radar tracking system according to claim 2, wherein said frequency error is added to the estimated target frequency to provide a controlling signal tending to maintain the I.F. target signal in the centre of the speedgate pass band.

4. A radar tracking system according to claim 2, wherein said digital filter means comprises an array of fast fourier transform filters each providing one said frequency bin, the output data being up-dated periodically and at each such up-date providing a new estimate of the target signal frequency derived from the preceding estimate and the current error.

5. A radar tracking system according to claim 2 in a missile, wherein the width of said frequency bins is controllable in dependence upon target range, the bin width being set to a low value in response to a long range target to optimise the acquisition threshold.

6. A radar tracking system according to claim 5, wherein said doppler tracking loop incorporates controllable gain elements which are set to low gain values in response to a long range target.

7. A missile-borne radar tracking system according to claim 2 in a missile, wherein the width of said frequency bins is controllable in dependence upon the estimated value of the difference between the target signal frequency and said predetermined frequency within the speedgate pass band, the bin width being increased in response to a high estimated value to give good tracking ability and decreased in response to a low estimated value to give good velocity discrimination against targets moving at low relative velocities.

8. A radar tracking system according to claim 1 in a missile, including means responsive to high acceleration rates of the missile to increase the width of said frequency bins and thus improve the quality of tracking at the expense of target discrimination.

9. A radar tracking system according to claim 8 wherein said doppler tracking loop incorporates controllable gain elements which are set to high gain values in response to high acceleration rates.

10. A radar tracking system according to claim 1 including an angle tracking loop employing sum and difference channels and means responsive to a ratio of the sum and difference signals to provide an indication of angular error between target line of sight and boresight, wherein each of said sum and difference channels employs means for producing a said derived signal characteristic, each such derived signal characteristic comprising a peaking characteristic similar to the individual characteristics of said digital filter means and centred on the estimated target signal frequency so as to provide a narrow frequency pass band which tracks the estimated target signal frequency.

11. In a monopulse radar tracking system employing sum and difference signals for the determination of target direction, the system comprising a doppler tracking loop maintaining an intermediate frequency target signal within a speedgate filter pass band, and digital filter means in each of the sum and difference channels providing at periodic update intervals an analysis over a plurality of adjacent frequency bins of target signal components within the said pass band, a method of confirming the presence or absence of a target signal within a particular frequency bin, in which a series of comparison processes are performed, each involving the sum of a predetermined number of successive power output values from the particular frequency bin accumulated with any previous such sums and a comparison of such cumulative sum with upper and lower threshold values which become progressively closer with each comparison process, confirmation of the presence of a target signal in any comparison process being indicated when the upper threshold is exceeded by said cumulative sum, confirmation of the absence of a target signal being indicated when the lower threshold exceeds the cumulative sum, and a further comparison process being initiated when the cumulative sum lies between the upper and lower thresholds.

12. A method according to that of claim 11 wherein after a said series of a predetermined number of said comparison processes the upper and lower thresholds are made coincident so as to force a target-signal-present, or absent, indication.

13. A method according to claim 11, wherein a running average is established incorporating a fixed number of said bin power output values, the earliest incorporated bin power output value being discarded as a current value is incorporated so as to produce a running average bin power, this running average being compared with a predetermined threshold to provide a target-signal-present, or absent, indication, the cumulative sum indication and the running average indication contributing to a net conclusion in which the cumulative sum indication takes precedence if the running average indication points to a target signal absent, and in which the possible results of the cumulative sum indication: target signal absent, indeterminate, present, are treated as: indeterminate, present, present, respectively if the running average indication points to a target signal present.

14. A radar tracking system employing sum and difference signals for the determination of target direction, the system including digital filter means in each of the sum and difference channels providing at periodic update intervals an analysis over a plurality of adjacent frequency bins of potential target signal components, means for identifying a target frequency bin, means for applying sum and difference signals in respect of the identified target frequency bin as input signals to product means for producing a complex product of one of said input signals and the complex conjugate of the other, a signal-to-noise ratio indication being derived from the imaginary component of said complex product and a power level indication of the sum channel signal within the target frequency bin, said signal-to-noise ratio indication thus having a high value in the presence of incoherent reflections from multiple targets and a low value in the presence of coherent reflections from a single target, the system further including a basic signal-to-noise ratio indication derived from power level within the target frequency bin and average power level over the plurality of frequency bins, this basic indication thus having a high value in the presence of single or multiple targets within the target frequency bin and a low value in the presence of wideband noise, and means responsive to both of said signal-to-noise ratio indications to provide an indication of single or multiple targets.

* * * * *